United States Patent [19]

Yamamoto et al.

[11] Patent Number: 4,908,662
[45] Date of Patent: Mar. 13, 1990

[54] AUTOMATIC ORIGINAL FEEDING APPARATUS HAVING AN IMAGE AREA DESIGNATING FUNCTION

[75] Inventors: Yasuyoshi Yamamoto, Tokyo; Toshirou Kasamura, Yokohama; Yasunori Maeda, Tokyo; Nobukazu Sasaki, Yokohama; Toshihiko Kusumoto, Tokyo; Naoki Okuda; Tatsuya Shiratori, both of Kawasaki; Takashi Ozawa, Ichikawa; Akiyoshi Kimura; Atsushi Kubota, both of Tokyo; Masashi Ohashi, Tokyo; Michiro Koike, Kawasaki, all of Japan

[73] Assignee: Canon Kabushiki Kaisha, Tokyo, Japan

[21] Appl. No.: 243,126

[22] Filed: Sep. 7, 1988

Related U.S. Application Data

[63] Continuation of Ser. No. 51,369, May 19, 1987, abandoned.

[30] Foreign Application Priority Data

May 20, 1986 [JP] Japan .................. 61-115796
May 20, 1986 [JP] Japan .................. 61-115798
May 20, 1986 [JP] Japan .................. 61-115799
May 20, 1986 [JP] Japan .................. 61-115800

[51] Int. Cl.$^4$ ............................ G03G 15/00
[52] U.S. Cl. ...................... 355/218; 355/231; 355/309; 355/75
[58] Field of Search .......... 355/3 R, 7, 3 SH, 14 SH, 355/14 R, 75, 202, 218, 230, 231, 309

[56] References Cited

U.S. PATENT DOCUMENTS 4,660,957 4/1987 Ueda et al. .................. 355/3 SH
4,707,126 11/1987 Ohshima et al. ................ 355/7 X

FOREIGN PATENT DOCUMENTS 56-81865 7/1981 Japan .
57-204066 12/1982 Japan .

Primary Examiner—Joan H. Pendegrass
Attorney, Agent, or Firm—Fitzpatrick, Cella, Harper & Scinto

[57] ABSTRACT

An automatic original feeding apparatus has a coordinates position detecting device provided with a supporting table for supporting thereon a sheet original of which the area during image formation is to be designated, a conveying device for directing the inserted sheet original to a predetermined position, and a feed device provided upstream of the conveying device and responsive to the termination of the area designation to change over to a feeding position and feed the sheet original on the supporting table to the conveying device.

15 Claims, 14 Drawing Sheets

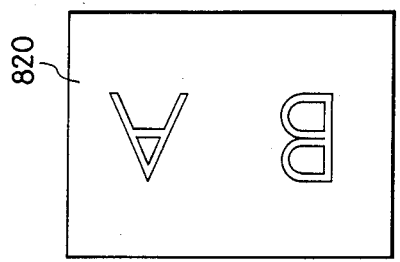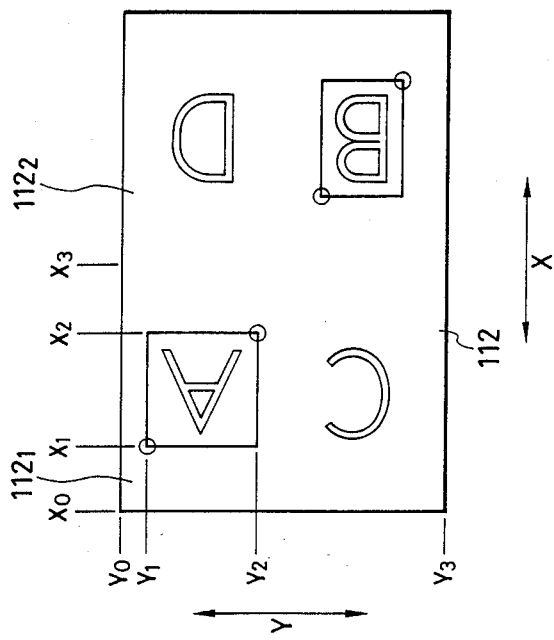

AUTOMATIC ORIGINAL FEEDING APPARATUS HAVING AN IMAGE AREA DESIGNATING FUNCTION

This application is a continuation of application Ser. No. 051.369 filed May 19, 1987, abandoned.

BACKGROUND OF THE INVENTION

1. Field of the Invention

This invention relates to an automatic original feeding apparatus and more particularly, to an automatic original feeding apparatus used in an image forming apparatus such as a copying apparatus or a recording apparatus having the image area designating function and provided with a digitizer (coordinates position detecting device) for reading the area of the original image.

2. Related Background Art

Heretofore, in copying apparatuses, an original has been placed onto an original supporting table (a platen) by hand, but placing a number of originals one by one onto the original supporting table has been inefficient and for this reason, it has become popular to mount on the copying apparatus an automatic original feeding apparatus for automatically feeding sheet originals onto the original supporting table and automatically discharging the sheet originals therefrom. Further, there are multifunction copying apparatuses endowed with the multiplex copying function of copying a plurality of originals on the same surface of a transfer medium, the multicolor copying function of using color (e.g., red, blue, etc) developing devices instead of the ordinary black developing device to obtain colored copy images, and the area designating function (or the coordinates position detecting function).

That is, the above-mentioned area designating function refers to selecting only the image of the necessary area from an original image and copying that image, and is such that when the desired image area is first measured in X and Y dimensions and the value thereof is input on an operating panel, a light-emitting element array provided near a photosensitive member for forming images emits light partly and time-serially in response to the signal to erase the electrostatic latent image of the unnecessary area on the photosensitive member, thereby obtaining the image of the necessary area.

Further, there is also a method of effecting area designation by the use of a digitizer (coordinates position detecting device). When utilizing this method, if an original is placed onto the digitizer and the necessary image area is pressed from above the original, that area is automatically detected and thus, the work of measuring the above-mentioned necessary area is not required.

A combination of the aforementioned multiplex copying function, multicolor copying function and area designating function may lead to achievement of a further multifunction. In the case of the previously mentioned multiplex copying, the plurality of originals have been different in locations of images and it has been necessary to choose the originals so that overlapping of copy images may not occur, but by the area designating function being added thereto, the image area in which overlapping will occur can be erased and it becomes unnecessary to choose the originals. Accordingly, the combination of these three functions enables a multiplex or multicolor image to be obtained from any original.

Of course, it can be easily accomplished to erase the unnecessary area image for an original and obtain necessary-area, image as previously described.

A description will now be provided of a prior-art copying apparatus having the above-mentioned area designating function and provided with an automatic original feeding apparatus.

This copying apparatus, as shown in FIG. 1 of the accompanying drawings, has an automatic original feeding apparatus 2 on the upper portion of the apparatus body M and is provided with an area designating apparatus 3 constructed separately from the copying apparatus body M. In the area designating apparatus 3, a digitizer 6 is installed on the digitizer supporting table 5 thereof and a stylus pen 7 is disposed thereon, and an original P is placed on the digitizer 6 with the image bearing surface thereof facing upward and with the right end thereof being in contact with an original-striker (not shown) and the inner side thereof being in contact with the original-striker, not shown. A desired area of the image bearing surface of the original P is then pressed by the stylus pen 7, whereby said area is designated and input. Various inputting methods or detecting methods have been proposed, but they will not be described in detail herein. When the desired area is input, whether the image of the input desired area should be presented or a desired mode of color designation or the like is selected by a function key 9, and a signal input by the digitizer 6 and the function key 9 is transmitted to the copying apparatus body M through a signal line 10. The original P placed on the digitizer 6 of the area designating apparatus 3 with the desired area thereof designated and input is then transferred onto the original tray 11 of the automatic original feeding apparatus 2 disposed on the upper portion of the copying apparatus body M, and is moved on the original tray 11 with the image bearing surface thereof facing downward and with the right end thereof which is in contact with the original-striker being as the leading end, and is inserted to a predetermined striking position of the automatic original feeding apparatus 2. Thereupon, the automatic original feeding apparatus 2 is operated to feed the original P to the image forming station of the copying apparatus body M, and the copying apparatus M effects a predetermined copying operation.

However, the above-described prior-art copying apparatus M has the separate area designating apparatus 3 and therefore requires extra installation space for the area designating apparatus 3. Also, since the area designating apparatus 3 is constructed separately from the copying apparatus M, the operator must go through numerous procedures of operation. That is, there is an original-striking reference in the digitizer 6 and there is further an original-striking reference in the automatic original feeding apparatus 2 and thus, the operator must accurately bring the right end of the original which bears against the original-striking reference in the digitizer 6 into contact with the original-striking reference in the automatic original feeding apparatus 2, and further must change the image-bearing surface of the original P from its upwardly facing position to its downwardly facing position and transfer the original P onto the original tray 11. These operations are cumbersome to the operator. Also, when the operator effects a wrong area designation and must re-designate the area, the work doubles with great inconvenience.

In view of this, an automatic original feeding apparatus having a digitizer made integral therewith has been proposed by the applicant (U.S. Application Ser. No. 895,031 filed Aug. 8, 1986).

This automatic original feeding apparatus devised by the applicant will hereinafter be described.

The automatic original feeding apparatus 20 devised by the applicant is disposed on the upper portion of a copying apparatus M having the area designating function, as shown in FIG. 2 of the accompanying drawings. The automatic original feeding apparatus 20 has a whole-surface belt 22 in the substantially central portion thereof which faces the platen glass 21 of the copying apparatus M, and is provided with an inlet tray 23 for supporting sheet originals thereon at one end. A feed roller shaft 25 is provided near the tray 23, and a feed roller 26 is secured to the shaft 25 for rotation with the feed roller shaft 25. A paper feeding arm 27 has one end thereof rotatably supported on the feed roller shaft 25, and a pick-up roller 29 is rotatably supported on the other end of the paper feeding arm 27. The pick-up roller 29 is pivotable up and down with the paper feeding arm 27 with the feed roller shaft 25 as the fulcrum. The rotation of the feed roller 26 may be transmitted to the pick-up roller 29 through a gear, not shown, so that the feed roller 26 and the pick-up roller 29 may be identical with each other in the direction of rotation and the peripheral speed thereof. Further, a front paper feeding roller 30 is rotatably provided in face-to-face relationship with the pick-up roller 29, and a rear paper feeding roller 31 is rotatably disposed in face-to-face relationship with the feed roller 26. A pick-up arm 33 having one end thereof secured to a pick-up arm shaft 32 is provided near the paper feeding arm 27, and a slide groove 33a is formed in the other end of the pick-up arm 33. A pin 27a projectedly provided on the paper feeding arm 27 fits in the slide groove 33a, and when the pick-up arm shaft 32 is rotated, the pick-up arm 33 pivots, and as the pick-up arm 33 pivots, the pick-up roller 29 pivots up and down and comes into pressure contact with or away from the front paper feeding roller 30. When the pick-up roller 29 comes into pressure contact with the front paper feeding roller 30, these two rollers 29 and 30 feed a sheet original nipped therebetween. An original presence detecting sensor $S_1$ which is a reflection type sensor is provided near the pick-up roller 29. On the other hand, a drive roller 35 and a turn roller 36 are disposed above the opposite ends of the platen glass 21, and the whole-surface belt 22 is passed over these two rollers 35 and 36. The whole-surface belt 22 is an endless belt having a sufficient width to cover the whole surface of a sheet original, and the surface thereof is coated with a rubber material having a sufficient coefficient of friction so as to be capable of conveying originals by the friction force thereof. The turn roller 36 is movable to the left and right, and it is biased leftwardly when the whole-surface belt 22 is passed thereover, and is designed such that the whole-surface belt 22 has sufficient tension and causes no slippage between it and the drive roller 35. Further, keep rollers 37a, 37b, 37c, ... are provided inside the whole-surface belt 22, and these keep rollers 37a, 37b, 37c are disposed at a pitch somewhat narrower than the size of the sheet original being conveyed. Further, these keep rollers 37a, 37b, 37c urge the whole-surface belt 22 against the platen glass 21 with a weak pressure force, thereby increasing the sheet original conveying force of the whole-surface belt 22. A pair of lower discharge rollers 39 and a pair of upper discharge rollers 40 are disposed near the turn roller 36 over which the whole-surface belt 22 is passed, and a discharge detecting sensor $S_2$ is disposed in proximity to the pair of lower discharge rollers 39 to detect the discharge of a sheet original and to turn on a jam lamp when no sheet original is detected even if a predetermined time elapses. A pair of curved guides 41 for guiding the discharged original is provided between the pairs of upper and lower discharge rollers 40 and 39 so as to guide the discharged sheet original from the pair of lower discharge rollers 39 to the pair of upper discharge rollers 40. Further, a digitizer 42 is disposed above the whole-surface belt 22, and this digitizer 42 designates and inputs an area of the sheet original placed thereon with the image bearing surface thereof facing upward as previously described, by such means as a stylus pen. An original-striking reference 43 is secured in proximity to one end of the digitizer 42 which faces the drive roller 35, so that when a sheet original is placed on the digitizer 42, the right end of the sheet original may bear against the original-striking reference 43 and the inner side edge of the sheet original may bear against a striker, not shown, whereby the sheet original may be positioned. A pair of carrying-in sheet guides 45 is provided from the original-striking reference 43 to the platen glass 21 and further, a pair of carrying-in rollers 46 is disposed in the intermediate portion of the pair of carrying-in sheet guides 45, and an original carrying-in path 47 is formed by the pair of carrying-in sheet guides 45. An original carrying-in portion sensor $S_3$ is disposed in face-to-face relationship with the upstream of the original carrying-in path 47, and a leading end detecting sensor $S_4$ is disposed in face-to-face relationship with the lower end of the pair of carrying-in sheet guides 45.

Designated by reference numeral 49 below the platen glass 21 is the optical system of the copying apparatus M.

Now, the automatic original feeding apparatus 20 is effective in that it does not require any extra installation space for the area designating apparatus and eliminates the necessity of changing the image bearing surface of the original from its upwardly facing position to its downwardly facing position, but the original Pb after the termination of the area designating operation must be released from the original-striking reference 43 by the operator and fed into the nip between the pair of carrying-in rollers 46. The work of releasing the original Pb from the original-striking reference 43 and feeding it into the nip between the pair of carrying-in rollers 46 is cumbersome, and has led to the undesirable possibility that the striking side of the original is bent and the original is misconveyed or obliquely moved.

SUMMARY OF THE INVENTION

The present invention has been made in view of the above-noted disadvantages peculiar to the prior art and an object thereof is to provide an automatic original feeding apparatus having a digitizer which is excellent in operability.

Another object of the present invention is to provide an automatic original feeding apparatus having a digitizer in which originals are not damaged.

Still another object of the present invention is to provide an automatic original feeding apparatus having a digitizer in which oblique movement of originals is not liable to occur.

To achieve the above objects, an automatic original feeding apparatus in accordance with the present invention is characterized in that an original of which the area has been designated by a digitizer is automatically fed.

BRIEF DESCRIPTION OF THE DRAWINGS

FIGS. 13A and 13B are plan views showing formed images.

DESCRIPTION OF THE PREFERRED EMBODIMENTS

Figure 1:
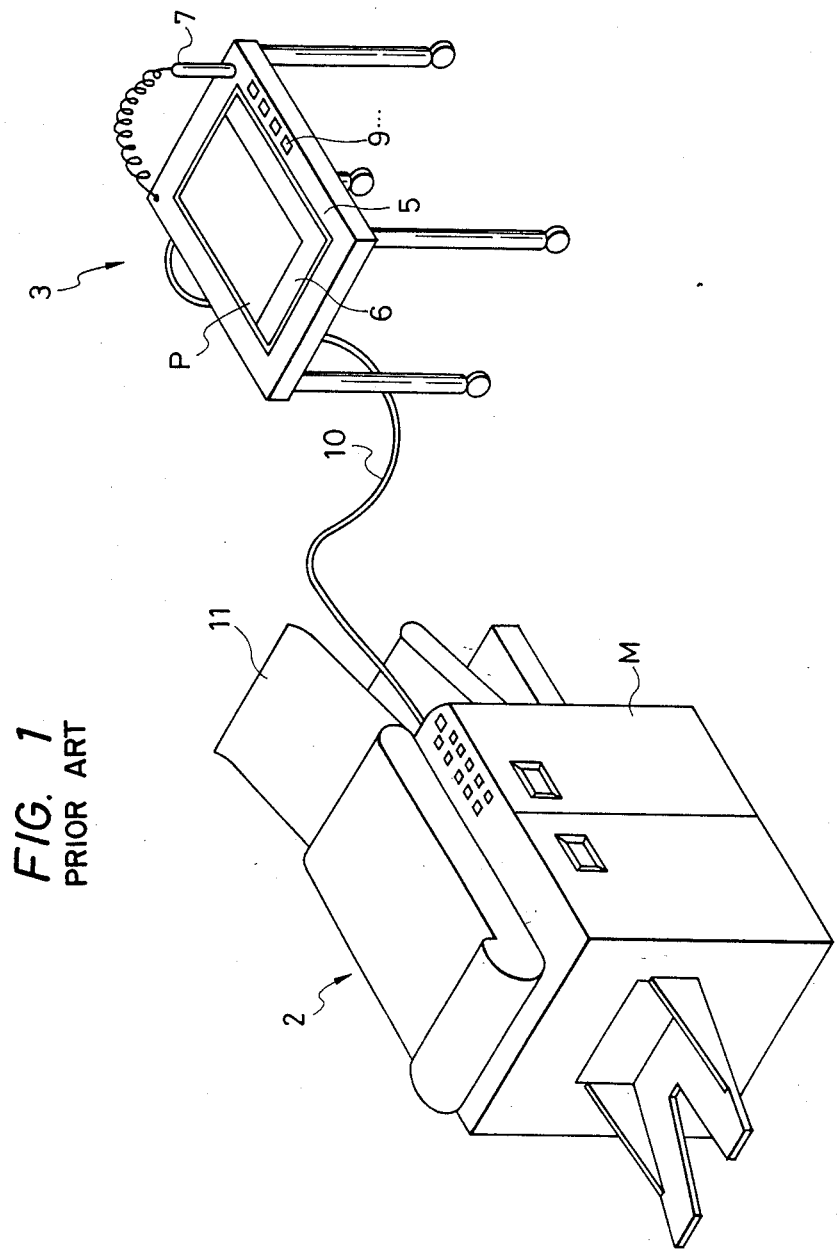
FIG. 1 is a perspective view showing an automatic original feeding apparatus and a coordinates position detecting device according to the prior art.
Figure 2:
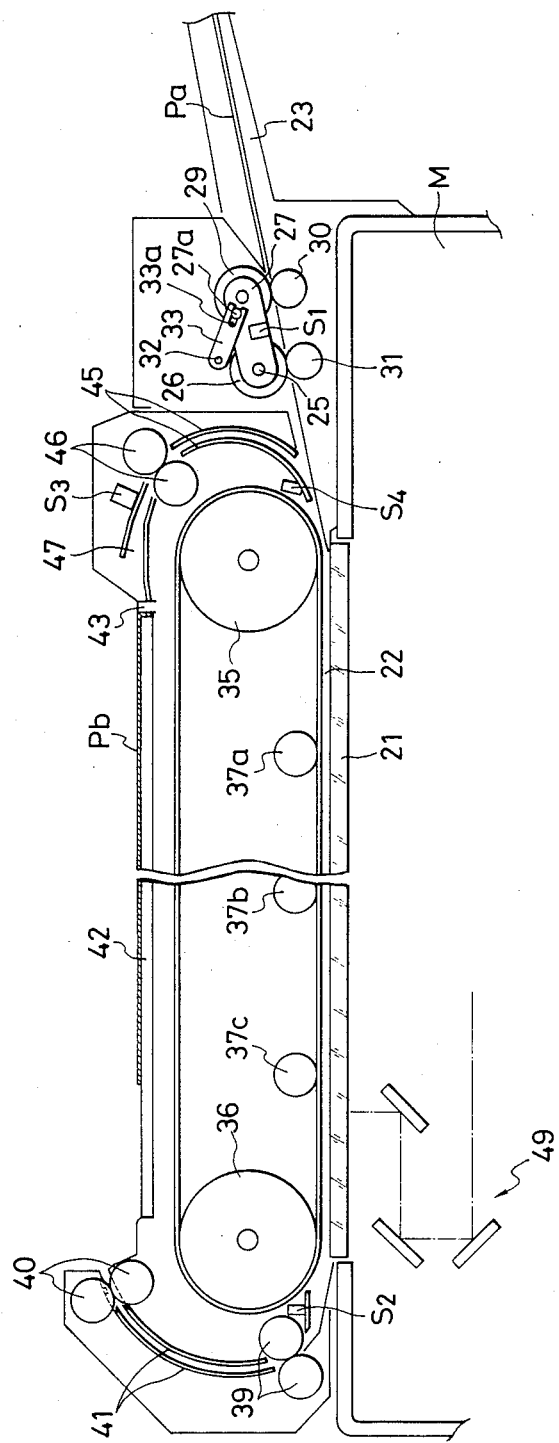
FIG. 2 is a cross-sectional view showing an unimproved automatic original feeding apparatus provided with a digitizer.

Some embodiments of the present invention will hereinafter be described with reference to the drawings. Portions similar to those of the previously described automatic original feeding apparatus of FIG. 2 are given similar reference characters and need not be described further.

Figure 3:
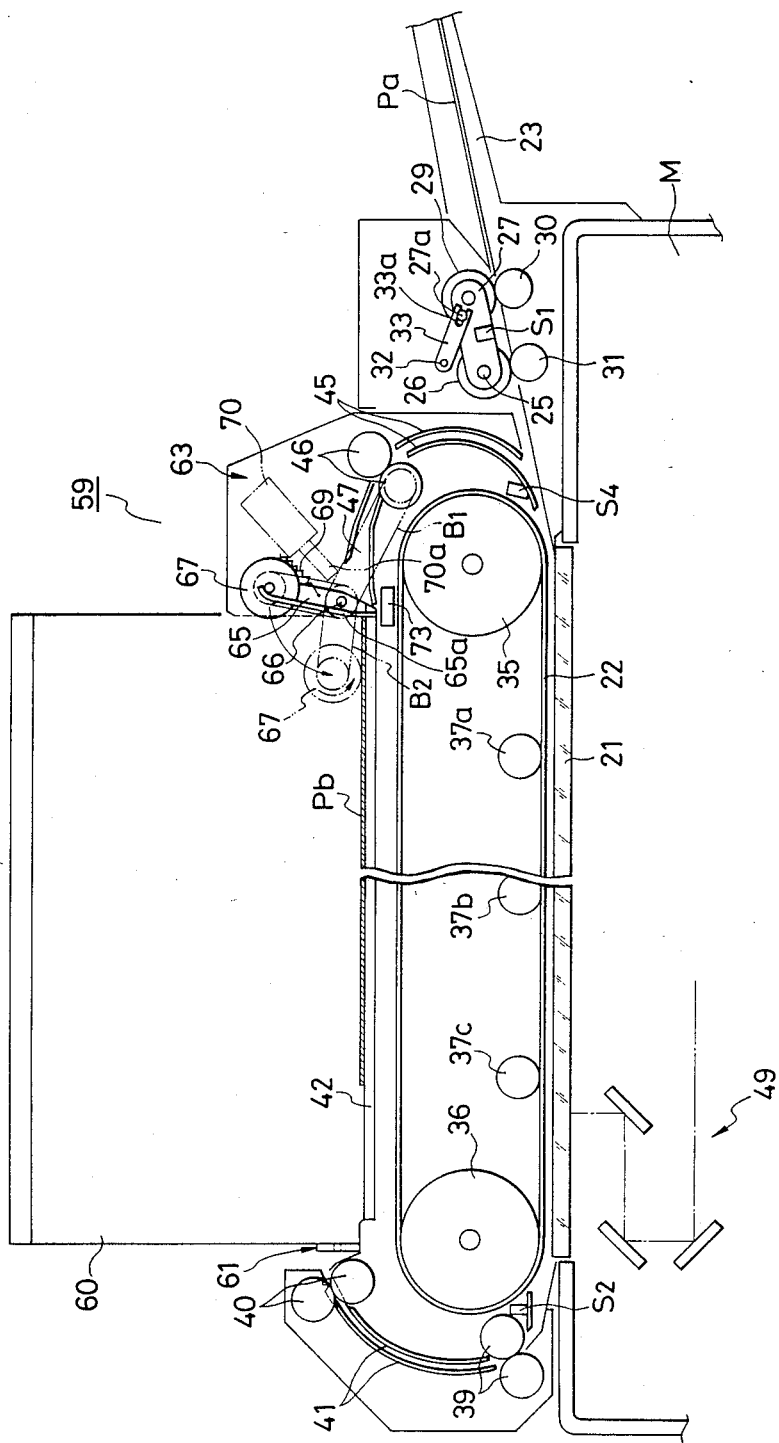
FIG. 3 is a cross-sectional view showing an embodiment of an automatic original feeding apparatus according to the invention.

An automatic original feeding apparatus 59 according to the present invention is placed on and constructed integrally with a copying apparatus body M, as shown in FIG. 3. A digitizer 42 is disposed at the center of the upper surface of the apparatus 59, and a cover member 60 is installed across the digitizer 42 for pivotal movement about a hinge 61. An inlet tray 23 is installed on the upstream side of conveyance in the automatic original feeding device 59. Further, a feed controlling portion 63 is disposed in face-to-face relationship with the tray 23.

Various portions will hereinafter be described in detail.

An original contacting member 65 is installed in the controlling portion 63 for pivotal movement about a pivot shaft 66. A controlling plate 65a extending in the direction of depth is provided on one side of the contacting member 65. A feed roller 67 is rotatably installed on one end of the contacting member 65, and the portion of the feed roller 67 which is somewhat adjacent to the pivot shaft 66 is biased by a spring 69. The end portion of the contacting member 65 which is opposite to the feed roller 67 is supported by the plunger 70a of a solenoid 70. Thus, in a state in which the solenoid 70 is not energized, the contacting member 65 is pivotally moved clockwise about the pivot shaft 66 as viewed in FIG. 3 and the feed roller 67 is raised upwardly. In this state, the lower end portion of the controlling plate 65 may assume a position for controlling one end of a sheet original Pb resting on the digitizer 42.

Figure 5A:
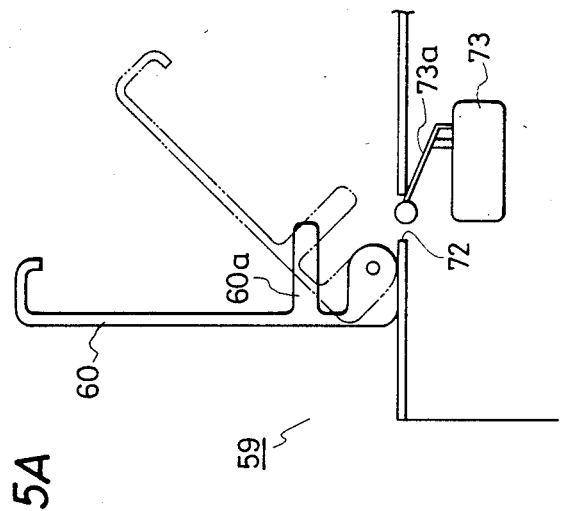
FIG. 5A is a side view showing the essential portions of the FIG. 3 apparatus.
Figure 5B:
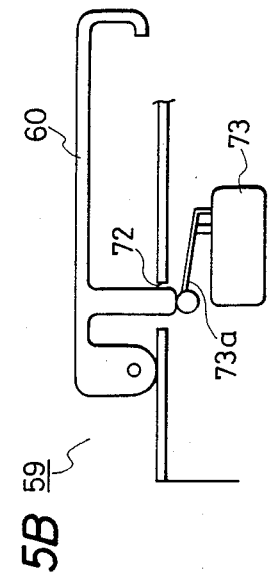
FIG. 5B is a cross-sectional view showing the operative state of the FIG. 3 apparatus.

As shown in FIGS. 5A and 5B, a projected portion 60a is formed near the base of the cover member 60. A hole 72 is formed in the upper surface of the feeding apparatus 59 at the opposite side edges of the digitizer so that the projected portion 60a of the cover member 60 may be inserted in the hole 72 when the cover member 60 is pivoted on the digitizer. A microswitch 73 is installed below the hole 72. The arm portion 73a of the microswitch 73 is designed so as to be actuated by the tip end of the projected portion 60a when the cover member 60 is pivoted on the digitizer 42 and the projected portion 60a thereof is inserted into the hole 72.

Figure 4:
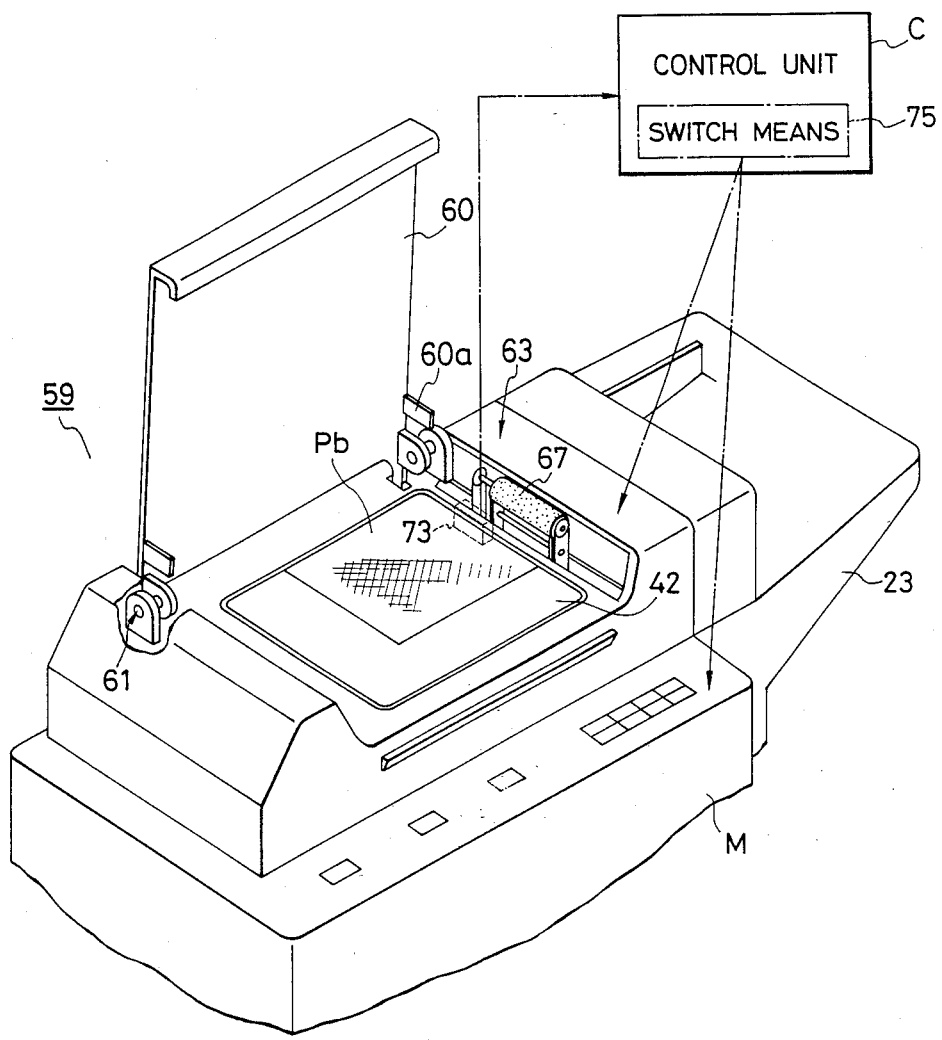
FIG. 4 is a perspective view of the FIG. 3 apparatus.

Also, as shown in FIG. 4, switch means 75 is installed in a control unit C. The switch means 75 is designed so as to operate conveying means such as the drive roller 35, original carrying-in roller 46 and feed roller 67 of the automatic original feeding apparatus 59 on the basis of a signal produced by the microswitch 73 when actuated with the cover member 60 being pivoted (closed) and at the same time, operate the copying apparatus M to effect the copying operation based on the area designation by the digitizer 42.

A description will first be provide of a case where copying is effected simply by the use of a sheet original Pa. The sheet original Pa is first placed onto the inlet tray 23 with the image bearing surface thereof facing downward, and the sheet original Pa is inserted between a pick-up roller 29 and a front paper feed roller 30. Thereupon, an original presence sensor $S_1$ senses the sheet original Pa and in a predetermined time after that, the pick-up roller 29 lowers and the sheet original Pa is nipped by and between the pick-up roller 29 and the front paper feed roller 30 (when there is no sheet original, the pick-up roller 29 is in its upwardly raised position). Simultaneously therewith, the drive roller 35 is rotated, whereby a whole-surface belt 22 is moved round. The pick-up roller 29 is then rotated, whereby feeding of the sheet original Pa is started. When the leading end edge of the sheet original Pa passes between a feed roller 26 and a rear paper feed roller 31 rotated simultaneously with the pick-up roller 29 and arrives at a leading end edge detecting sensor $S_4$, the leading end edge of the sheet original Pa is detected by the leading end edge detecting sensor $S_4$. From this time, a photointerrupter, not shown, begins to measure the timing of conveyance of the sheet original Pa. Subsequently, the sheet original Pa comes between the whole-surface belt 22 and platen glass 21 and, when the leading end edge thereof comes below a first keep roller 37a, the conveying force of the whole-surface belt 22 increases and the speed of the sheet original Pa becomes equal to the peripheral speed of the whole-surface belt 22 and becomes higher than the peripheral speed of the feed roller 26, and the feed roller 26 is rotated as the sheet original Pa is moved. When the trailing end edge of the sheet original Pa is then detected by the leading end edge detecting sensor S$_4$, the rotation of the feed roller 26 and of the pick-up roller 29 is stopped and thus, the next sheet original is not fed. When the predetermined timing measured by the photointerrupter then comes, the whole-surface belt 22 is stopped and the sheet original Pa conveyed by the whole-surface belt 22 is placed at a predetermined position on the platen glass 21. Thus, the exposure operation of the copying apparatus M is started immediately. Then, the whole-surface belt 22 starts to rotate by the copy end signal of the copying apparatus M, conveyance of the sheet original Pa is started, and thus, the sheet original Pa is guided by a pair of discharged original guides 41 while being nipped between a pair of lower discharge rollers 39 and is discharged by a pair of upper discharge rollers 40. After the sheet original Pa is discharged, the whole-surface belt 22 stops its rotation. When the original presence sensor S$_1$ has detected the next sheet original, feeding of said next sheet original is started after a discharge detecting sensor S$_2$ detects the leading end edge of the sheet, original Pa.

A description will now be provided of a case where the copying operation is effected with the area being designated and input by the use of the digitizer 42. The operator first pivots (opens) the cover member 60 and spaces it apart from the digitizer. The operator then places on the digitizer a sheet original Pb for effecting area designation, and presses the input surface of the digitizer 42 from above the sheet original Pb by means of a stylus pen or the like, thereby designating a desired area. The mode of whether the image of the input desired area should be presented is selected by a function key. Further, when the cover member 60 is pivoted to a position for covering the digitizer 42, the projected portion 60a of the cover member 60 is inserted into the hole 72 to press the arm portion 73a of the microswitch 73, whereby the microswitch 73 is switched on. When the detection signal by the microswitch 73 is supplied to the switch means 75 in the control unit C, the switch means 75 operates the automatic original feeding apparatus 59 and the copying apparatus M on the basis of said detection signal. Accordingly, the sheet original Pb on the digitizer 42 is fed and placed onto the platen glass 21 by the feed roller 67, the pair of original carrying-in rollers 46, the drive roller 35 and the whole-surface belt 22 which are operated in response to the closing movement of the cover member 60, and is exposed to light by the copying apparatus body M. The rollers 46 and 67 are connected together through belts B$_1$ and B$_2$, and the roller 67 is also rotated during rotation of the rollers 46. The rollers 46 are rotated through a motor, not shown. The whole-surface belt 22 starts to rotate actuated by the copy end signal of the apparatus body M, whereby the sheet original Pb is discharged onto the cover member 60 which is covering the digitizer 42.

Figure 6A:
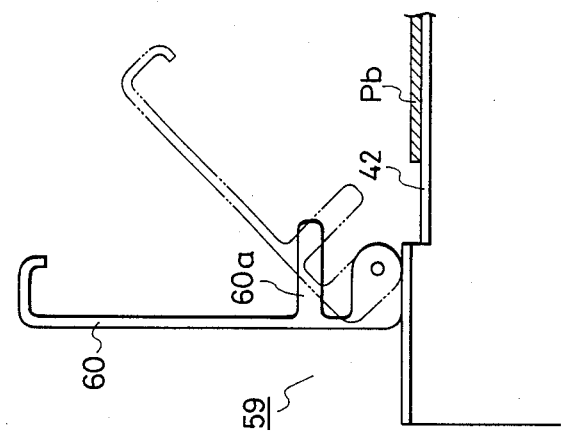
FIG. 6A is a side view showing another embodiment of the present invention.
Figure 6B:
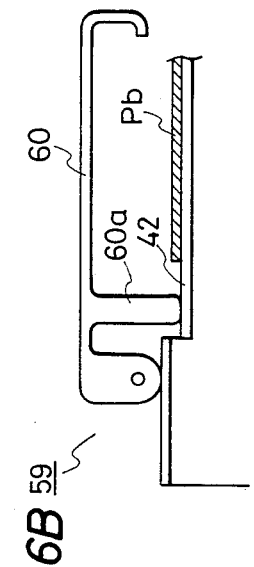
FIG. 6B is a side view showing the operative state of the FIG. 6A embodiment.

The present embodiment is constructed so that by closing the cover member 60 openably-closably installed on the automatic original feeding, apparatus 59, the microswitch 73 is switched on to thereby operate the automatic original feeding apparatus 59 and the copying apparatus M, whereas this is not restrictive. For example, as shown in FIGS. 6A and 6B, the design may be made such that the input surface of the digitizer 42 is pressed by the projected portion 60a formed on the cover member 60 and on the basis of the signal provided during the inputting, the automatic original feeding apparatus 59 and the copying apparatus M are operated by the aforementioned switch means 75, and such a design may use detecting means simpler than the microswitch 73.

As described above, according to the present embodiment, by the operation of the switch means based on the detection signal indicative of the movement of the protective member produced by the protective member detecting means, the automatic original feeding apparatus and the image forming apparatus are operated in response to the movement of the protective member to the position for covering the coordinates position detecting device and therefore, image forming operation can be simply accomplished by placing a sheet original on the coordinates position detecting device and inputting the area designation, and thereafter moving the protective member onto said detecting device while keeping that state. Thus, the cumbersome work of effecting the area designating operation for each sheet original and moving the protective member, and further operating the operating switch to thereby effect the image forming operation becomes unnecessary and accordingly, the operator can efficiently progress his or her work to thereby shorten the working time.

Another embodiment of the present invention will now be described. Portions similar to those in the previous embodiment are given similar reference characters and need not be described again.

Figure 7:
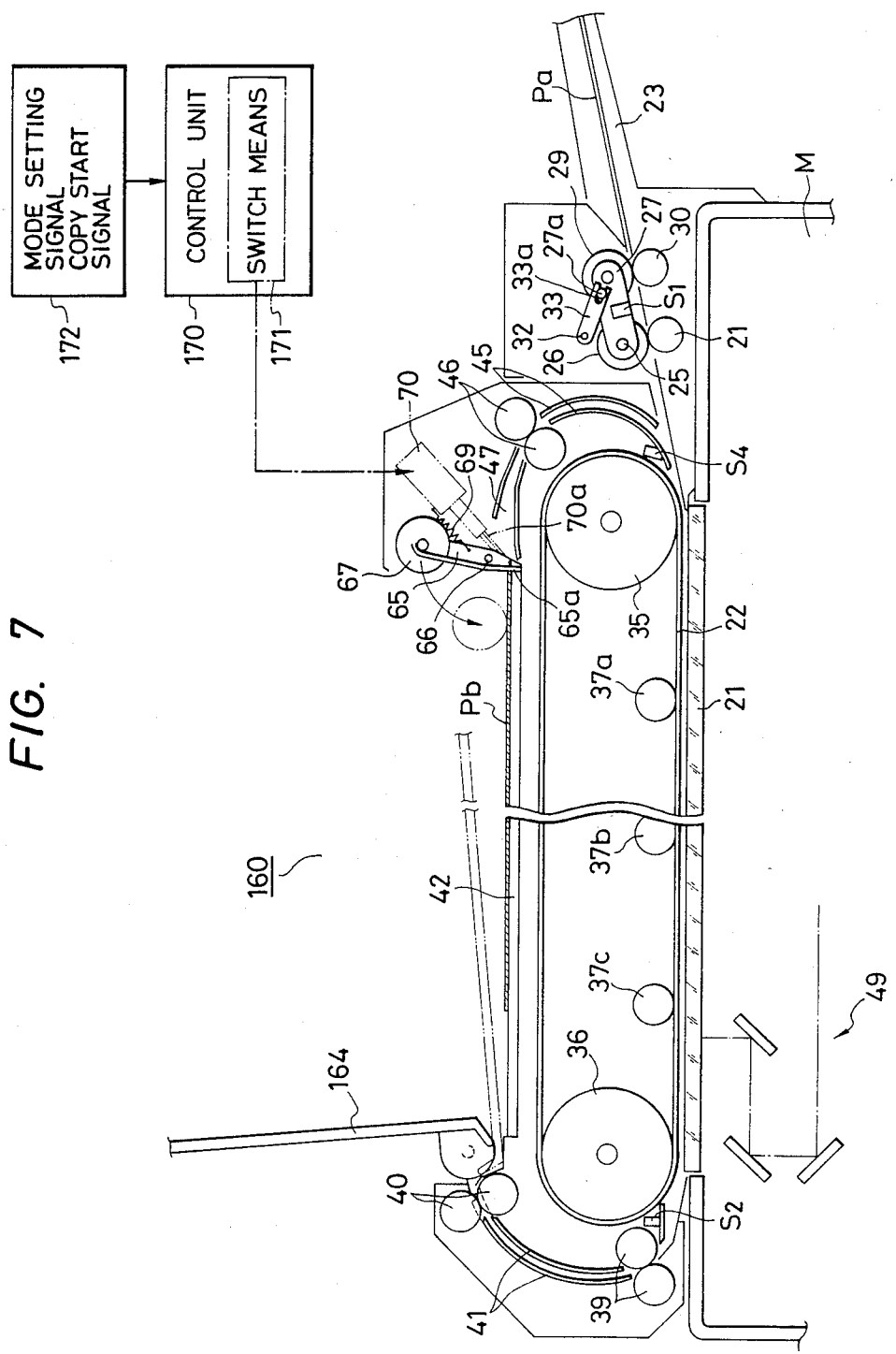
FIG. 7 is a cross-sectional view of still another embodiment of the present invention.

Referring to FIG. 7, switch means 171 for changing over the original-striking reference 65 to a position for contacting the sheet original Pb and a position for releasing the contact is provided in the control unit 170 of the automatic original feeding apparatus 160. The switch means 171 supplies electric power to the plunger 70 and changes over the original-striking reference 65 to the position for contacting the sheet original Pb on the basis of a signal 172 such as a mode setting signal after the area designation of the original image or a copy start signal which provides a sheet original image area designation end signal, and interrupts the plunger 70 and changes over the original-striking reference 65 to the position for releasing the contact with the sheet original in a predetermined time after the reception of said mode setting signal or said copy start signal, or by the detection of the trailing edge of the sheet original Pb by the leading edge detecting sensor S$_4$. At that time, the feed roller 67 disposed at one side edge 65a of the original-striking reference 65 is displaced to a position for contacting the upper surface of the sheet original Pb resting on the digitizer 42 or a position spaced apart from the sheet original, in accordance with the displacement of the original-striking reference 65. The feed roller 67 when in the position in which it contacts the sheet original Pb is rotated in the direction of the arrow in response to rotation of the pair of carrying-in rollers 46 to feed the sheet original Pb to the original carrying-in path 47.

The operation of the automatic original feeding apparatus 160 according to the present embodiment will be described hereinafter.

The operation in a case where the sheet original Pa placed on the inlet tray 23 is simply copied is similar to the operation of the automatic original feeding apparatus 20 devised by the applicant and therefore need not be described.

When area designation is to be effected by the use of a sheet original Pb, a cover 164 is first opened and the sheet original Pb is placed at a predetermined position on the upper surface of the digitizer 42 with the image bearing surface thereof facing upward and with the leading end edge thereof bearing against the other side edge 65a of the upright original-striking reference 65 and further with the inner side thereof bearing against a striker, not shown. A desired area on the surface of the original is designated and input by such means as a stylus pen. After the inputting has been terminated, the cover 164 is closed and setting of a mode of whether the image of the designated area should be presented is effected by a function key, not shown. When a signal 172 such as a signal of the mode setting or other copy start signal which provides a sheet original image area designation end signal is output, the switch means 171 in the control unit 170 supplies electric power to the plunger 70 on the basis of said signal and changes over the original-striking reference 65 to the sheet original contact releasing position. Thereupon, the other side edge 65a of the original-striking reference 65 is retracted upwardly and, in the retracted position, it provides a guide for feeding the sheet original Pb. On the other hand, the feed roller 67 is displaced to the sheet original contacting position in accordance with the displacement of the original-striking reference 65 and comes into contact with the sheet original Pb placed on the digitizer 42. In a predetermined time after the of the mode setting signal or the copy start signal, the drive roller 35 is rotated and further, the whole-surface belt 22 is moved round. Thereafter, the feed roller 67 and the pair of carrying-in rollers 46 are rotated, so that the sheet original Pb is guided along the other side edge 65a of the original-striking reference 65 and the pair of carrying-in sheet guides 45 by the feed roller 65 and the pair of carrying-in rollers 46 and is automatically fed along the original carrying-in path 47 toward the platen glass 21. The operation after that is similar to the operation of the automatic original feeding apparatus devised by the applicant and therefore need not be described. The sheet original Pb is discharged onto the upper surface of the closed cover 164.

In the present embodiment, the automatic original feeding apparatus has been described with respect to an example in which a digitizer is provided in conjunction with a so-called DF (document feeder) of the type which feed sheet originals one by one, but alternatively, a digitizer may be provided in conjunction with a so-called ADF (auto document feeder) which sets a number of originals and feeds them one by one.

As described above, according to the present embodiment, a sheet original having the image area thereof designated by the coordinates position detecting device may be automatically fed to the image forming area of the image forming apparatus and therefore, the cumbersome manual work of resetting the sheet original placed on the coordinates position detecting device on the sheet original feeding portion such as the pair of carrying-in rollers is eliminated and the operation becomes very simple and reliable, and the possibility of that side edge of the original which strikes against the original-striking reference and erroneous conveyance or oblique movement of the original can be eliminated.

Still another embodiment of the present invention will now be described. In this embodiment, members similar in construction to those in FIG. 3 are given similar reference characters and need not be described again.

Figure 9:
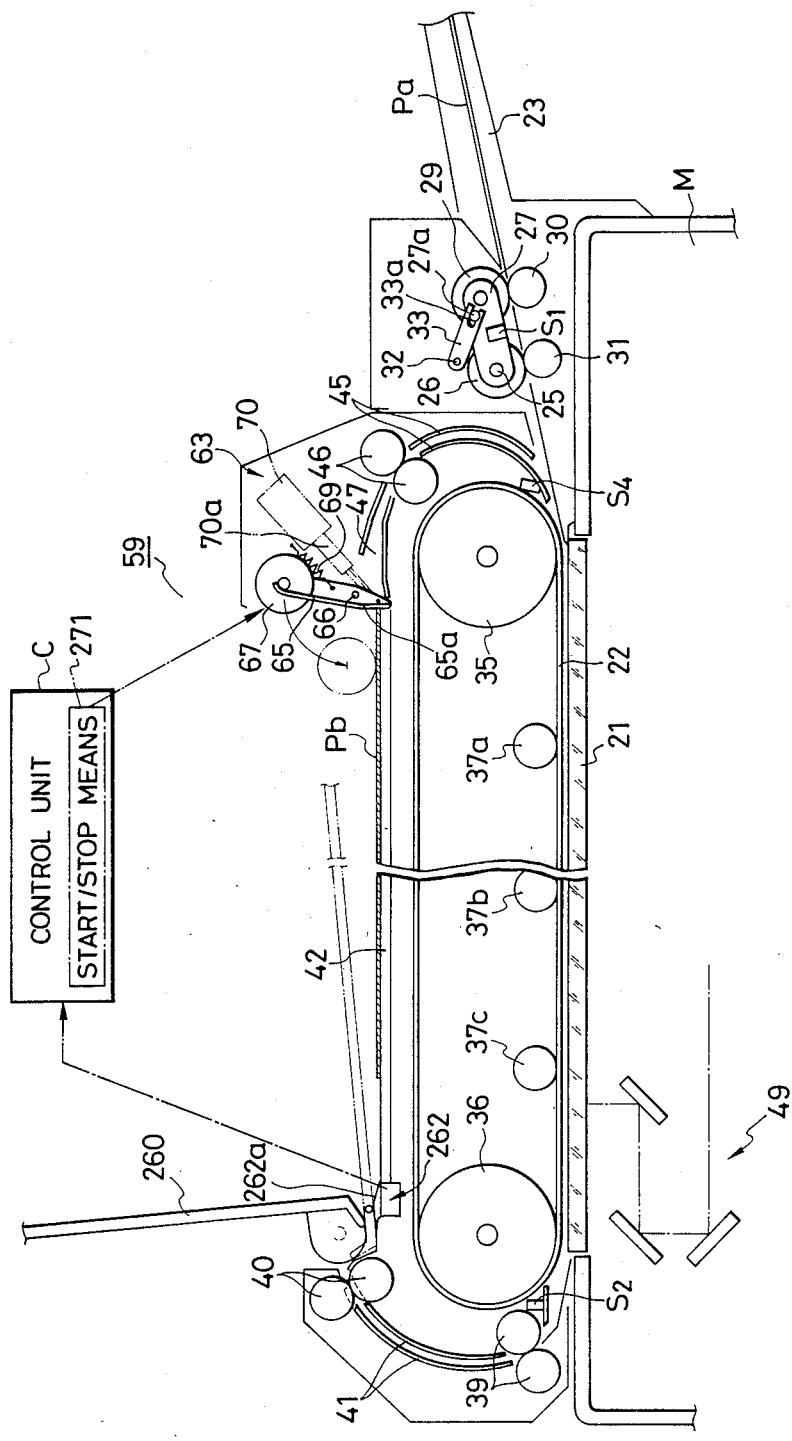
FIG. 9 is a cross-sectional view of yet still another embodiment of the present invention.

Referring to FIG. 9, the automatic original feeding apparatus 59 is provided with a control unit C in which operating and stopping means 271 is installed. This operating and stopping means 271 is designed to control the conveying means such as the feed rollers 26, 67, the drive roller 35 and the discharge rollers 39, 40 on the basis of a detection by a microswitch 262 so as to be operable whenever a cover member 260 is not pivoted and spaced apart from the digitizer 42 after the completion of the preceding copying operation, and to control said conveying means and the digitizer 42 so as to be operable whenever the cover member 260 is pivoted and spaced apart from the digitizer 42 and placed on the digitizer.

Figure 10:
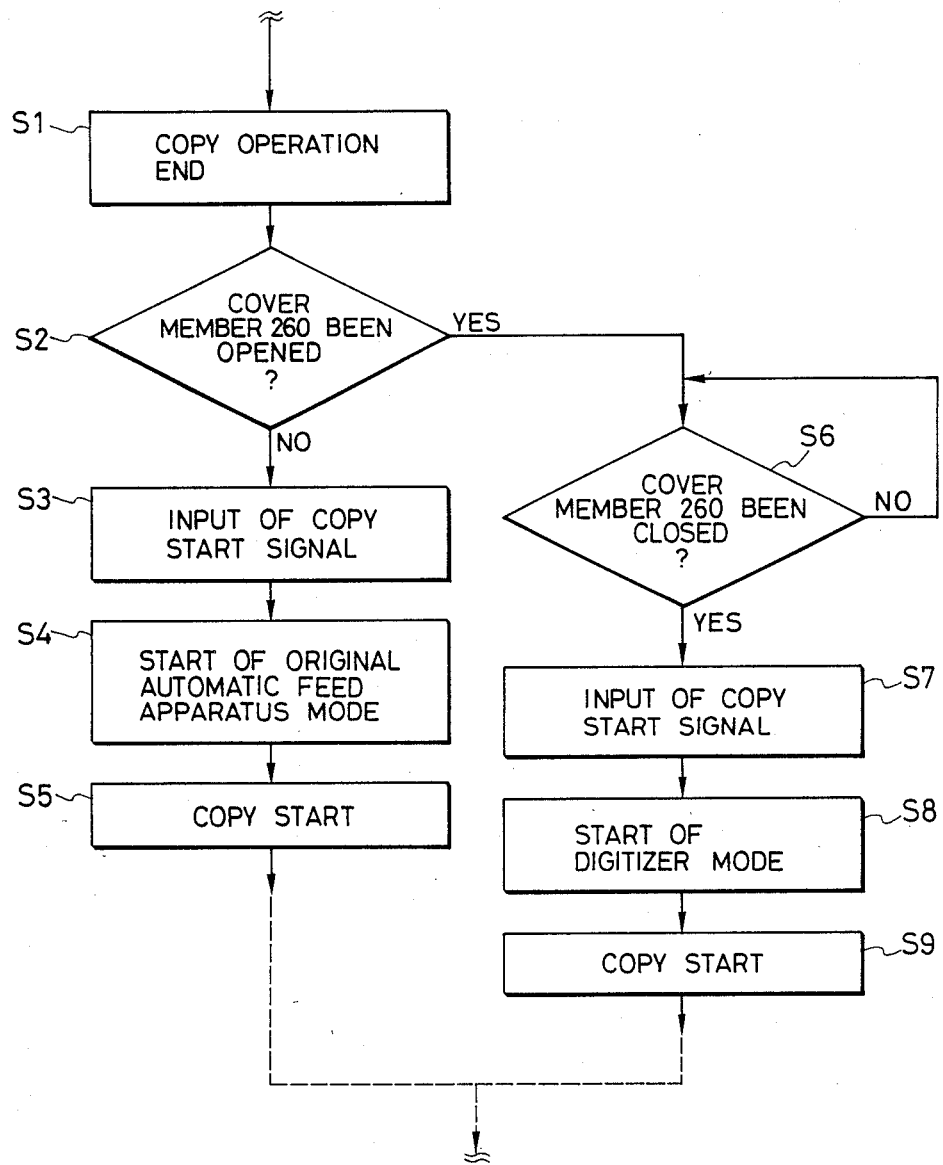
FIG. 10 is a flow-chart.

The operation of the present embodiment having the above-described construction will now be described with reference to the flow chart shown in FIG. 10. After the preceding copying operation has been terminated (step S1), whether the cover member 260 has been opened is detected by the microswitch 262 (step S2). If the opening movement of the cover member 260 is not detected, that is, if the cover member 260 is not spaced apart from the digitizer 42 after the termination of the preceding copying operation, an operating switch, not shown, is operated in this state and the next copy signal is input (step S3), whereupon the automatic original feeding apparatus 59 is started as in the automatic original feeding apparatus mode (step S4), and a sheet original Pa is placed from the inlet tray 23 onto a predetermined position on the platen glass 21 by the feed roller 26 and the drive roller 35. Then, a copy start signal is immediately supplied to the copying apparatus body M, whereby copying is started and the exposing operation of the apparatus body M is started (step S5). By the copying operation end signal of the body M, the whole-surface belt 22 begins to discharge the sheet original Pa, which is thus discharged onto the cover member 260 by the pair of discharge rollers 39 and 40.

Figure 8:
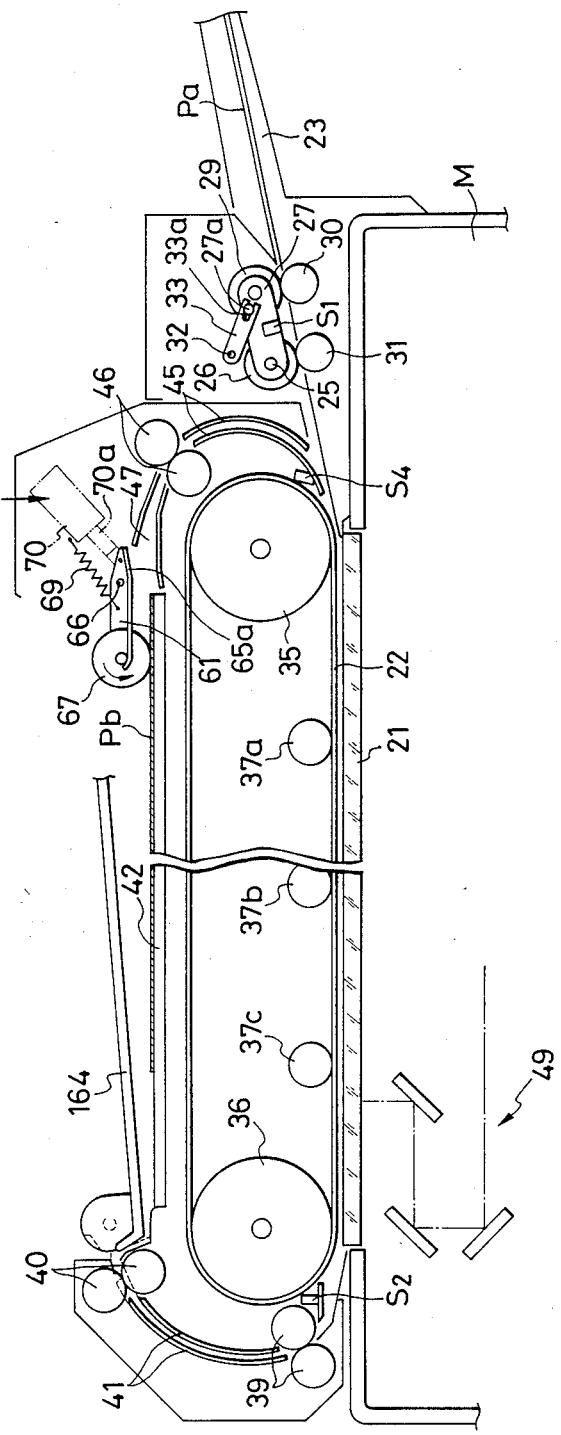
FIG. 8 illustrates the operation of the FIG. 7 embodiment.

When the opening movement of the cover member 260 is then detected, the copy start signal remains unreceived until the next opening movement of the cover member is detected. When the operator places a sheet original Pb onto the digitizer 42 and presses a desired area of the digitizer 42 by means of a stylus pen or the like to thereby complete the area designation input and further pivots the cover member 260 to place it onto the digitizer 42 (step S6), the arm portion 262a of the microswitch 262 is pressed by the back of the cover member 260, whereby the microswitch 262 is switched on. Further, in this state, the solenoid 70 is supplied with electric power by the copy start signal of the copying apparatus body M (step S7), so that the plunger 70a attracts the original contacting member 65. Thereby the contacting member 65 is pivoted about the pivot shaft 66 against the biasing force of the spring 69 and, as shown in FIG. 8, the feed roller 67 is urged against the sheet original Pb on the digitizer 42 (step S8). At this time, the controlling plate 65a of of the original contacting member 65 is retracted from the conveyance path of the sheet original Pb and provides a guide plate for guiding the upper portion of the sheet original Pb. Accordingly, in this state, the controlling plate 65a guides the upper surface of the sheet original fed by the feed roller 67, and can reliably guide it to the original carrying-in path 47 even when the leading end portion of the original Pb is curled. After a predetermined time has elapsed, the drive roller 35 is driven and further, the feed roller 67 and the pair of carrying-in rollers 46 are driven. Thus, the sheet original Pb is fed to the pair of carrying-in rollers 46 by the feed roller 67, and further fed to the drive roller 35 along the pair of carrying-in sheet guides 45, and then is placed onto the platen glass 21 by the whole-surface belt 22. Then, a copy signal is immediately supplied, whereby the copying operation is started (step S9) and the exposing operation of the copying apparatus body M is started. Further, by the copy end signal of the body M, the whole-surface belt 22 begins to discharge the sheet original Pb, which is thus discharged onto the cover member 260 by the pair of discharge rollers 39 and 40.

Figure 11:
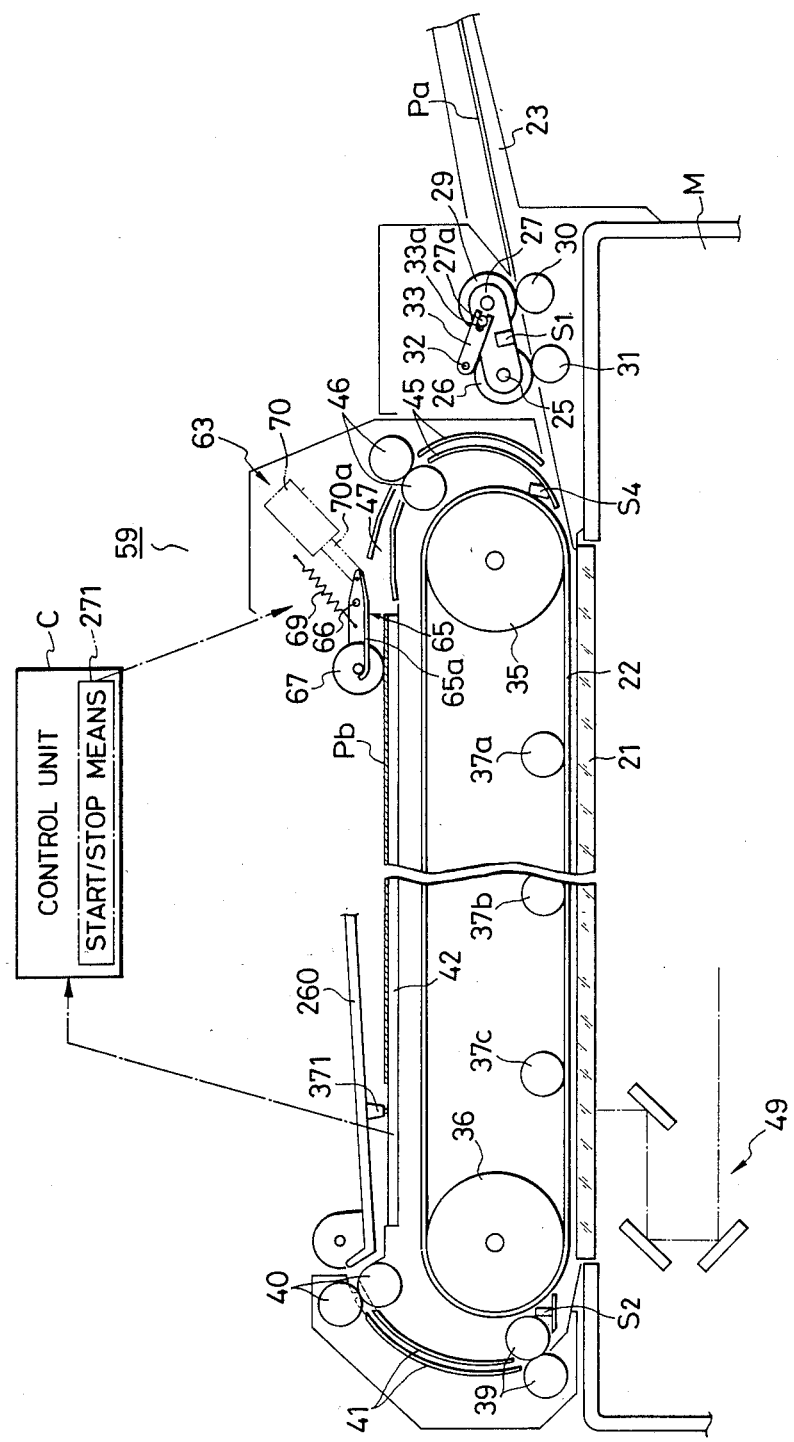
FIG. 11 is a cross-sectional view of a further embodiment of the present invention.

The present embodiment is designed such that the microswitch 262 is operated by the cover member 260 openably-closably installed in the automatic original feeding apparatus 59 and the original conveying means such as the feed roller 67 is operated only in the state in which the cover member 260 covers the digitizer 42, but alternatively, design may be made such that as shown in FIG. 11, a projected portion 371 is provided on the back of the cover member 260 so that the input surface of the digitizer 42 may be pressed by the projected portion 371 and that whether the cover member 260 is positioned on the digitizer 42 is detected by detecting whether the projected portion 371 is pressing the input surface of the digitizer 42.

As described above, according to the present invention, protective member detecting means for detecting the presence of the protective member and operating and stopping means for controlling the original conveying means on the basis of the signal from the detecting means are installed so that the original conveying means may be rendered inoperable in a state in which the protective member is spaced apart from the coordinates position detecting device and may be rendered operable in a state in which the protective member covers said detecting device and therefore, actuating the operating switch by mistake when inputting is being effected with the protective member being spaced apart from the coordinates position detecting device to thereby discharge the sheet original onto said detecting device can be reliably prevented. Thus it can be prevented that the sheet original which is increased in temperature by the radiant heat from a halogen lamp or the like during copying is discharged onto said coordinates position detecting device and the detecting device is damaged by the heat or friction of the original. Also, any malfunctioning by trouble or in said detecting device can be eliminated. Further, in a state in which the protective member is hampering the discharge path of the sheet original, the sheet original is not discharged, whereby jamming of the sheet original can be reliably prevented. Also, the inconvenience that the operator effects wrong inputting by being hindered by other sheet original fed to the coordinates position detecting device during the inputting to said detecting device can be reliably prevented.

Also, if the design is such that the original conveying means can operate when the protective member is not spaced apart from the coordinates position detecting device on the basis of the detection of the presence of the protective member after the termination of the preceding image forming operation and that the coordinates position detecting device, together with the original conveying means, can operate when the protective member is spaced apart from the coordinates position detecting device and assumes its position for covering it, the operation of the automatic original feeding apparatus not using the coordinates position detecting device and the operation of the automatic original feeding apparatus using the coordinates position detecting device can be distinguished from each other. Thereby, only when the coordinates position detecting device is used, said device can be rendered operable and malfunctioning of the coordinates position detecting device can be prevented more reliably.

Further, if the protective member detecting means is comprised of a projected portion installed on the protective member and the coordinates position detecting device, the existing coordinates position detecting device can be effectively utilized to provide protective member detecting means merely by providing a simple projected portion on the protective member, whereby the number of parts can be reduced to achieve a reduction in the cost.

The operation of the copying machine upon designation of a desired image area on the digitizer will be described hereinafter.

Figure 12:
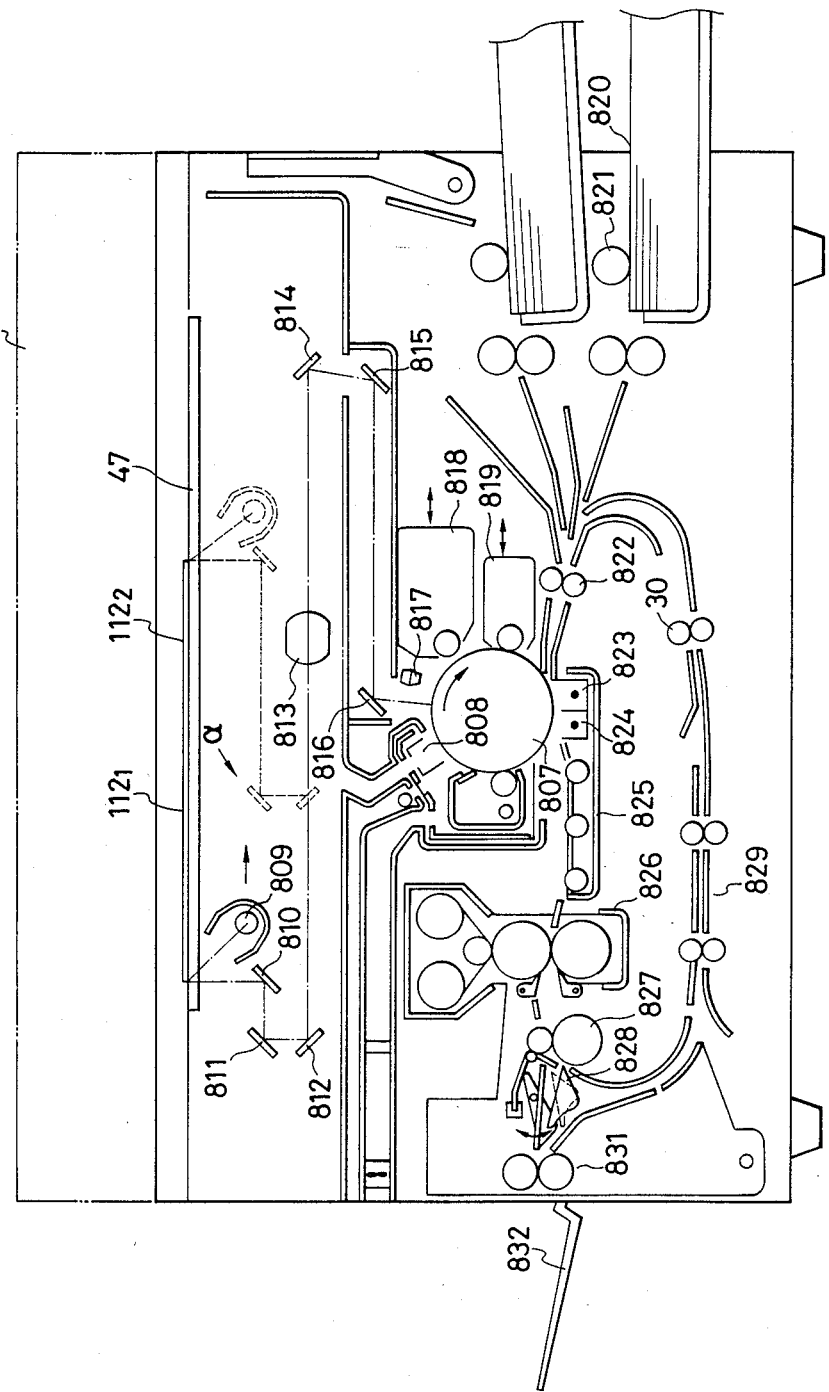
FIG. 12 is a cross-sectional view illustrating the image forming portion of an image forming apparatus.

FIG. 12 is a sectional view of a copying machine employing the present invention. The arrangement and operation of the copying machine will be described with reference to FIG. 12 and FIGS. 13A and 13B. The operation is exemplified by double copying with multicolor and image area designation functions. An original 112 consists of an original $112_1$ and an original $112_2$ which have the images shown in FIG. 13A. After an image A of the original $112_1$ and an image B of the original $112_2$ are extracted, the image A is copied in black and the image B is copied in red on transfer paper, as shown in FIG. 13B. For this purpose, the operator simultaneously depresses three buttons, i.e., the double copying button, the multicolor copying button, and the area designation button. At the same time, a red selection button is depressed for the second copying cycle (normally, the black toner is automatically selected in the first copying cycle, but the red toner may be selected for the first copying cycle). The operation will be described in detail below. The original 112 is placed on the digitizer 101, as shown in FIG. 13A. The input or stylus pen diagonal points (x1, y1) and (x2, y2) indicated by the hollow dots in FIG. 13B, designate the image A. The image B is also designated in the same manner as described above. The original 112 is placed on the original platen glass 47 in the manner as previously described.

When the operator depresses a copy button on the operation panel, a photosensitive drum 807 is uniformly charged by a charger 808 and is rotated in a direction of the arrow. At the same time, an illumination system including a lamp 809, and mirrors 810, 811 and 812 starts exposing the original $112_1$ with light. After the illumination system scans the original $112_1$ up to the alternate long and short dashed line a, the system returns to the initial position. An original image scanned by the illumination system is guided onto the photosensitive drum 807 through a lens 813 and mirrors 814, 815 and 816. An electrostatic image of the original $112_1$ is thus formed on the photosensitive drum 807. A light-emitting element array 817 consisting of a large number of light-emitting elements such as LEDs is arranged along a direction of the central axis (i.e., the direction perpendicular to surface of FIG. 12). The light-emitting element array 817 is selectively turned on along the Y direction in FIG. 13A in response to an area designation signal and is operated time-serially along the X direction. The drum surface portion corresponding to the area excluding the image A is exposed and discharged. Even if the original image is exposed on the discharged drum surface portion, any latent image (in this case, the image C) excluding the image A is not formed on the photosensitive drum. The copying machine includes a red toner developing unit 818 and a black toner developing unit 819. These developing units 818 and 819 can be moved with respect to the drum 807. In the state shown in FIG. 12, the red toner developing unit 818 is spaced apart further from the photosensitive drum 807 than the black toner developing unit 819. Therefore, the latent image of the image A is developed and visualized as a black toner image.

On the other hand, transfer paper 820 is fed by a paper feed roller 821 in the copying machine and is stopped by register rollers 822. The register rollers 822 start rotation at a time when the distal end of the original is aligned with the distal end of the transfer paper. The transfer paper 820 is thus fed in the direction of the drum 807. An image is transferred by a transfer charger 823 to the transfer paper 820. The transfer paper 820 is separated by a separating charger 824 from the photosensitive drum 807. The transfer paper 820 reaches a fixer 826 through a convey mechanism 825, thereby fixing the image on the transfer paper 820. Thereafter, the transfer paper 820 is fed to a first exhaust roller 827. However, when double copying is designated, a flapper 828 is located by a drive source (not shown) immediately behind the roller 827 to a position indicated by the dotted line. After the transfer paper 820 passes the first exhaust roller 827, it is fed to a lower convey mechanism 829 through the flapper 828. The transfer paper 820 reaches lateral register rollers 830 and is clamped and stopped thereby. In this state, the flapper 828 returns to the position indicated by the solid line. The black toner developing unit 819 is separated from the photosensitive drum 807 and the red toner developing unit 818 comes close thereto.

The illumination system including the lamp 809, and the mirrors 810, 811 and 812 is driven and temporarily stopped at the position indicated by the alternate long and two short dashed line o. The illumination system is then restarted to the position indicated by the dotted line. The illumination system then starts exposure of the original $112_2$ from this position. After original scanning is completed, the illumination system returns to the position of the solid line. The image of the original $112_2$ by this exposure is guided onto the surface of the drum. In the same manner as in the original $112_1$, the light-emitting element array 817 is turned on in response to the area designation signal. Even if the other original image is exposed on the drum surface, a latent image of any other image (in this case, the image D) excluding the image B is not formed on the photosensitive drum 807. The latent image of the image B on the photosensitive drum 807 is developed by the red toner developing unit 818. On the other hand, the transfer paper 820 clamped between the lateral register rollers 830 is fed to the register rollers 822 upon rotation of the rollers 830. The lateral register rollers 830 rotate the feed direction of the transfer paper through 90° while feeding the transfer paper. The transfer paper 820 is fed toward the register rollers 822, and at the same time, the position perpendicular to the feeding direction of the transfer paper 820 is corrected to be the same as in the original $112_1$. The subsequent operation for the transfer paper 820 is the same as that for the original $112_1$. However, after the transfer paper 820 passes through the first exhaust roller 827, it is guided above the upper edge of the flapper 828 and reaches a second exhaust roller 831. Finally, the transfer paper 820 is transferred onto a tray 832. Therefore, a multicolor image shown in FIG. 13B is formed on the transfer paper 820.

There will now be described the flows of operations in the embodiments as shown in FIGS. 3 and 7 with reference to FIGS. 14 to 16.

Figure 15:
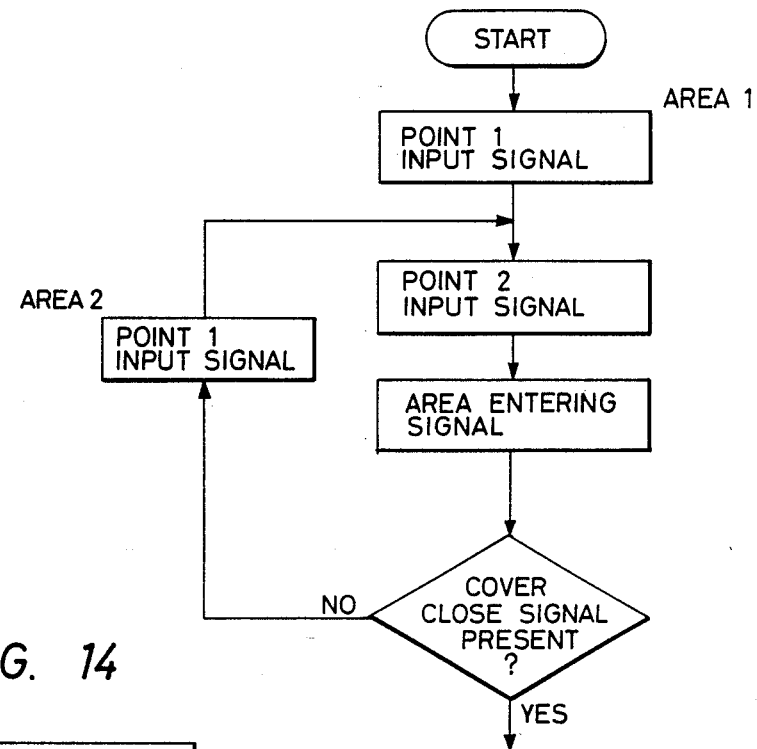
FIG. 15 is a flow chart for the embodiment as shown in FIG. 3.
Figure 14:
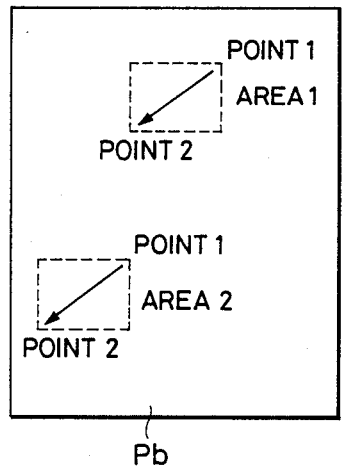
FIG. 14 is a plan view of an original Pb in which two areas are designated.

Referring to FIG. 15, point 1 and point 2 on an original stacked on the digitizer are pressed by a stylus pen as shown in FIG. 14, and then an unrepresented area entering input portion provided on the operation unit of the digitizer is pressed by the stylus pen. After the input of the area entering signal, the designation of area 1 has been completed.

If area 2 should be further designated, the designation of area 2 may be effected as shown in FIG. 14 following the steps as described concerning the designation of area 1. If the designation of area 2 is not required, the cover 60 is closed after the designation of area 1. Upon the closure of the cover 60, the plunger 70 is actuated, so that serial operations including original feed, copy medium feed, original reading, image transfer onto the copy medium are started. In this embodiment, the closure signal of the cover 60 is a signal of the area designation end.

Figure 16:
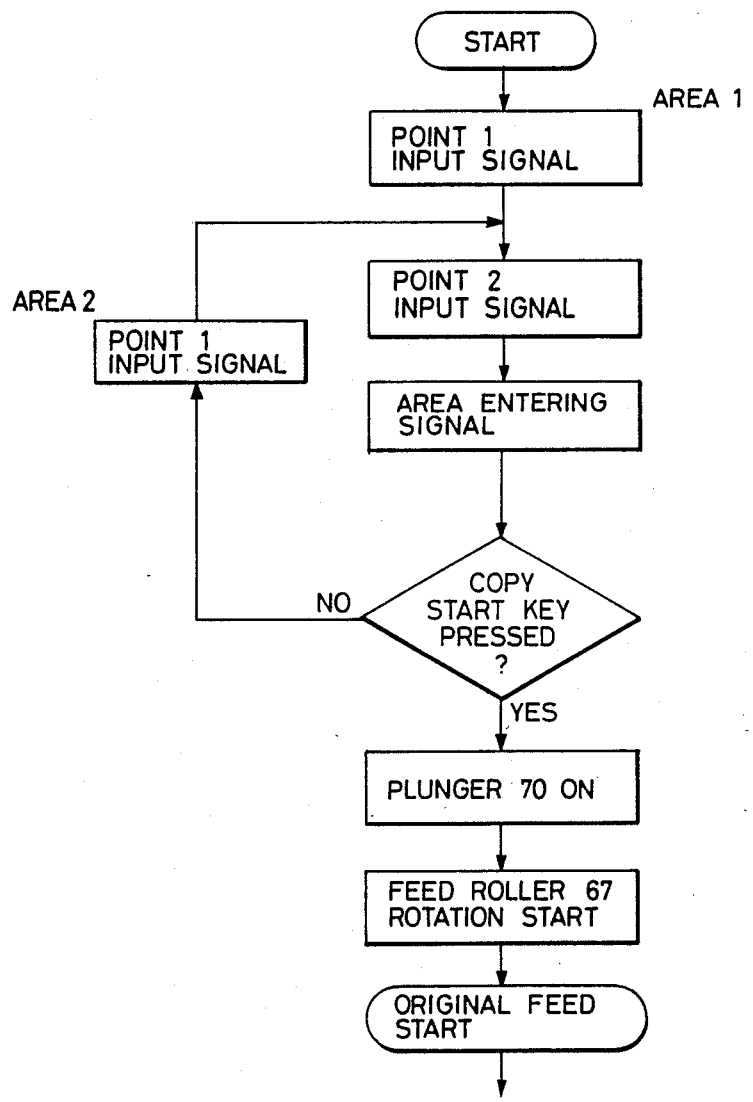
FIG. 16 a flow chart for the embodiment as shown in FIG. 7.

Referring to FIG. 16, point 1 and point 2 on an original stacked on the digitizer are pressed by a stylus pen as shown in FIG. 14, and then an unrepresented area entering input portion provided on the operation unit of the digitizer is pressed by the stylus pen. After the input of the area entering signal the designation of area 1 has been completed.

If area 2 should be further designated, the designation of area 2 may be effected as shown in FIG. 14 following the steps as described concerning the designation of area 1. If the designation of area 2 is not required, a copy start signal key would be pressed after the designation of area 1. Upon the pressing of the copy start key, the plunger 70 is actuated, so that serial operations including original feed, copy medium feed, original reading, image transfer onto the copy medium are started. In the embodiment as shown in FIG. 7, a copy start signal is the signal of the end of area end. Alternatively, a digitizer area designation end button, which may serve as the area entry input portion, may be provided instead of the copy start key, in order to start the serial copy operations after pressing the end button.

When an original is placed on the digitizer 42 and without area designation, the cover 60 is closed in the embodiment of FIG. 3 or the copy button is pressed in the embodiment of FIG. 7, respectively, the roller 67 is changed over into the feed condition.

What is claimed:

1. An automatic original feeding apparatus comprising:
   original conveying means for introducing an original to a reading position;
   a coordinates position detecting device disposed above said original conveying means and provided with a supporting table for supporting thereon a first sheet original with an image surface thereof facing upwardly and having means for designating an area of the first sheet original for image formation;
   conveying means for directing the first sheet original along a curved path to said original conveying means;
   feed means provided upstream of said conveying means and responsive to the termination of an area designation by said designating means to change over to a feeding condition and feed the first sheet original on said supporting table to said conveying means; and original supplying means for introducing a second sheet original to said original conveying means with passing through said detecting device and said conveying means.

2. An automatic original feeding apparatus according to claim 1, further comprising controlling means displaceable to a position in which it blocks the insertion of the sheet original and a position in which it does not block the insertion of the sheet original, said controlling means being adapted to be retracted to said non-blocking position upon the termination of the area designation.

3. An automatic original feeding apparatus according to claim 2, wherein said controlling means comprises sheet original positioning means.

4. An automatic original feeding apparatus according to claim 2, wherein said feed means comprises a roller rotatably supported on one end of a lever means comprising said controlling means.

5. An automatic original feeding apparatus according to claim 1, wherein said feed means is responsive to a copy start signal to change over to a feeding condition.

6. An automatic original feeding apparatus comprising:
a coordinates position detecting device provided with a supporting table for supporting thereon a sheet original and having means for designating an area of the sheet original for image formation;
conveying means for directing the sheet original to a predetermined position;
feed means provided upstream of said conveying means and responsive to the termination of an area designation by said designating means to change over to a feeding condition and feed the sheet original on said supporting table to said conveying means;
cover means movable between a closed position for covering said supporting table and an opened position for uncovering said supporting table; and
means for changing over said feed means to the feeding condition by the closure of said cover means.

7. An automatic original feeding apparatus according to claim 6, further comprising:
controlling means adapted to assume a position for blocking the insertion of the sheet original to said conveying means when said cover means is in said opened position and to be retracted to a position in which it does not block the insertion of the sheet original when said cover means is in said closed position.

8. An automatic original feeding apparatus according to claim 7, wherein said controlling means and said feed means are alternately moved to a feeding position by pivotal movement of lever means.

9. An automatic original feeding apparatus according to claim 6, further comprising:

second sheet feeding means for directing the sheet original to a predetermined position without the intermediary of said conveying means.

10. An automatic original feeding apparatus according to claim 9, wherein said second sheet feeding means has a sheet path capable of directing the sheet original substantially straight to said predetermined position without reversing the sheet original, and said conveying means has a curved sheet path for reversing and directing the sheet original to said predetermined position.

11. An automatic original feeding apparatus according to claim 10, wherein said supporting table is provided above said predetermined position.

12. An automatic original feeding apparatus according to claim 1, wherein said cover means comprises a table for receiving the sheet original discharged from said predetermined position.

13. An automatic original feeding apparatus according to claim 6, further comprising:
means for detecting the movement of said cover means to said closed position; and
control means for controlling said change-over means by a signal from said detecting means.

14. An automatic original feeding apparatus comprising:
a coordinates position detecting device provided with a supporting table for supporting thereon a sheet original and having means for designating an area of the sheet original for image formation;
conveying means for directing the sheet original to a predetermined position;
feed means provided upstream of said conveying means and responsive to the termination of an area designation by said designating means to change over to a feeding condition and feed the sheet original on said supporting table to said conveying means;
cover means movable between a closed position for covering said supporting table and an opened position for uncovering said supporting table; and
means for inhibiting the operation of said feed means when said cover means is in said opened position.

15. An automatic original feeding apparatus comprising:
coordinates position detecting means provided with a supporting table for supporting thereon a sheet original and having means for designating an image area of the sheet original for image formation;
conveying means for directing the sheet original to a predetermined position;
feed means provided upstream of said conveying means and feeding the sheet original on said supporting table to said conveying means by changing over into a feed condition;
cover means movable between a closed position where it covers said supporting table and an open position where the cover is open; and
means for changing over said feed means into the feed condition upon the closing of said cover means.

* * * * *

UNITED STATES PATENT AND TRADEMARK OFFICE
CERTIFICATE OF CORRECTION

PATENT NO. : 4,908,662

DATED : March 13, 1990

INVENTOR(S) : YASUYOSHI YAMAMOTO, ET AL.

It is certified that error appears in the above-identified patent and that said Letters Patent is hereby corrected as shown below:

COLUMN 2

Line 2, after "obtain" insert --the--.
    Line 3, "sary-area" should read --sary area--.

COLUMN 6

Line 35, "provide" should read --provided--.

COLUMN 7

Line 21, "sheet," should read --sheet--.
    Line 58, "feeding," should read --feeding--.

COLUMN 9

Line 24, "the of" should be deleted.
    Line 43, "feed" should read --feeds--.

COLUMN 10

Line 54, "of of" should read --of--.

COLUMN 11

Line 38, "Thus" should read --Thus,--.
    Line 44, "or" should be deleted.

UNITED STATES PATENT AND TRADEMARK OFFICE
CERTIFICATE OF CORRECTION

PATENT NO. : 4,908,662
DATED : March 13, 1990
INVENTOR(S) : YASUYOSHI YAMAMOTO, ET AL.

It is certified that error appears in the above-identified patent and that said Letters Patent is hereby corrected as shown below:

COLUMN 13

Line 39, "line o." should read --line $\alpha$.--.

COLUMN 16

Line 15, "claim 1," should read --claim 11,--.

Signed and Sealed this

Twentieth Day of August, 1991

Attest:

HARRY F. MANBECK, JR.

Attesting Officer

Commissioner of Patents and Trademarks